United States Patent [19]

Russo, III

[11] Patent Number: 5,480,262
[45] Date of Patent: Jan. 2, 1996

[54] OIL CONTAINMENT BOOM

[76] Inventor: Baldassare Russo, III, 4461 - 137th SE., Bellevue, Wash. 98102

[21] Appl. No.: 217,624
[22] Filed: Mar. 25, 1994
[51] Int. Cl.$^6$ ................................................. E02B 15/04
[52] U.S. Cl. ................................ 405/66; 405/63; 405/71
[58] Field of Search ............................... 405/60, 63, 64, 405/66, 70, 71, 72

[56] References Cited

U.S. PATENT DOCUMENTS

| | | |
|---|---|---|
| 3,653,213 | 4/1972 | Childers . |
| 4,116,007 | 9/1978 | Stagemeyer et al. . |
| 4,300,856 | 11/1981 | Magoon et al. . |
| 4,330,223 | 5/1982 | Webb . |
| 4,422,797 | 12/1983 | McAllister et al. . |
| 4,507,017 | 3/1985 | Magoon ................................. 405/66 |
| 4,781,493 | 11/1988 | Fischer . |
| 4,923,332 | 5/1990 | Sanocki . |
| 5,056,958 | 10/1991 | Campbell . |

FOREIGN PATENT DOCUMENTS

| | | | |
|---|---|---|---|
| 1305469 | 8/1962 | France ..................................... | 405/71 |
| 3929528 | 3/1990 | Germany . | |
| 2035913 | 6/1980 | United Kingdom . | |

OTHER PUBLICATIONS

Acme Products Co. Product Catalog for Containment Booms.
Chempro—Product Catalog for "Petro Barrier".

Primary Examiner—Dennis L. Taylor
Attorney, Agent, or Firm—William G. Forster

[57] ABSTRACT

A continuous oil containment boom foldable to a compact configuration for storage in standard size 8' by 8' by 20' shipping containers, arranged for quick deployment. The containment boom comprising a plurality of boom segments having a lower floatation member and an upper impermeable barrier that is inclined to extend over the layer of contaminants to further serve as a thermal shield barrier to lower the temperature in the area adjacent to the upper barrier. The boom segments being joined end-to-end by pivot joints having vertically oriented overlapping plates that are pivotally connected by a pivot hinge for relative pivotal movement about a horizontally axis, the pivot joints further having a pair of vertically oriented hinge assemblies for relative pivotal movement about a vertical axis. Each pivot joint being shielded by a joint shield attached to one of the overlapping plates, the joint shield being inclined to extend over the layer of contaminants in a plane substantially the same as the thermal shield. Each boom segment having a counterbalance structure that extends downward from the lower floatation member to maintain the boom segments in proper position. The lower floatation member being vented to allow the escape of expanding gasses.

6 Claims, 4 Drawing Sheets

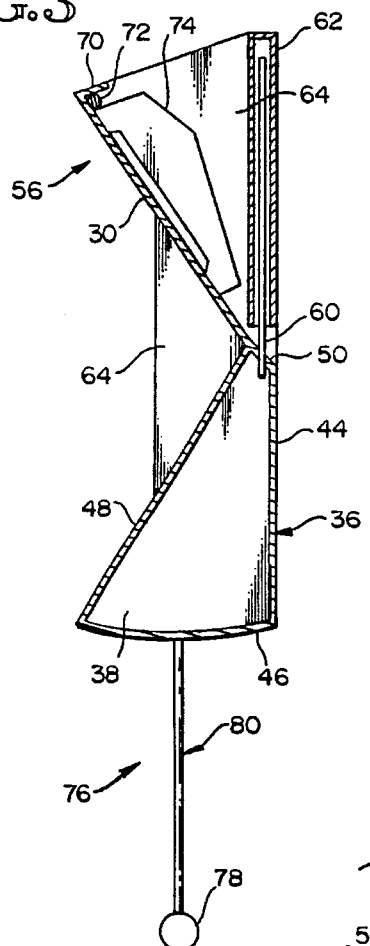
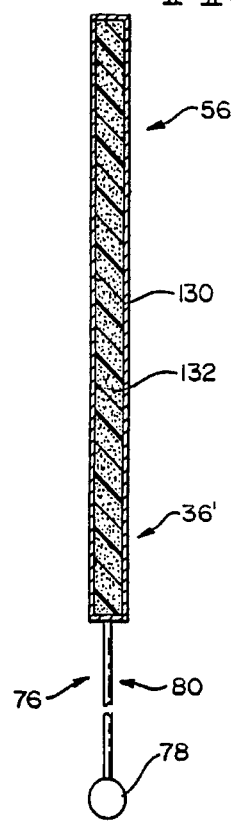
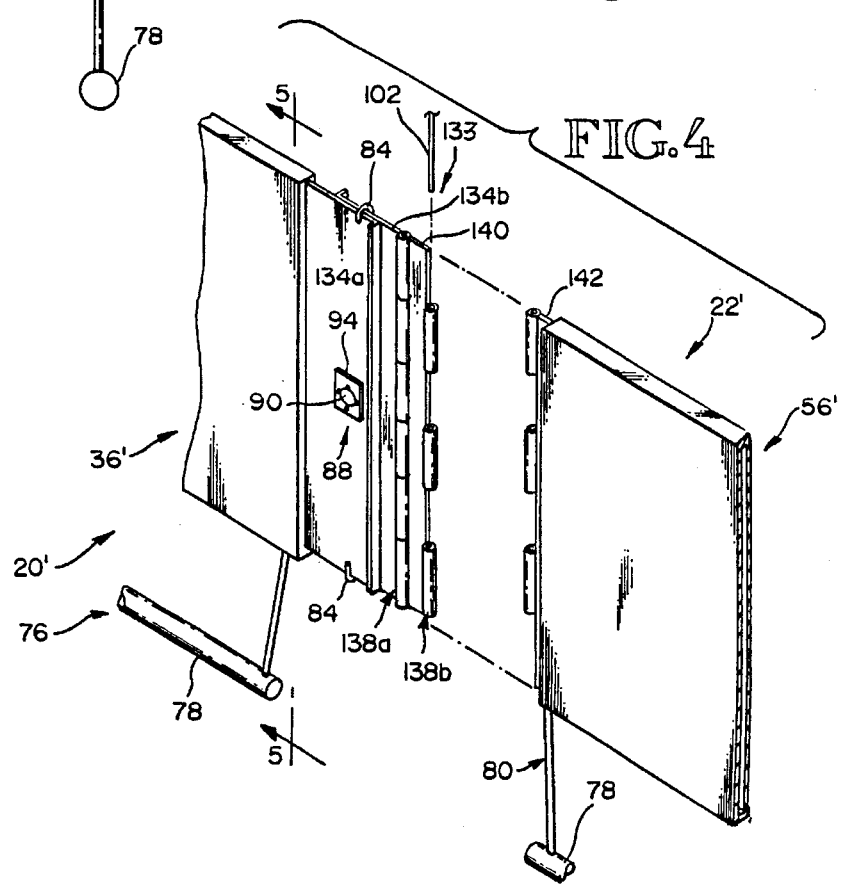

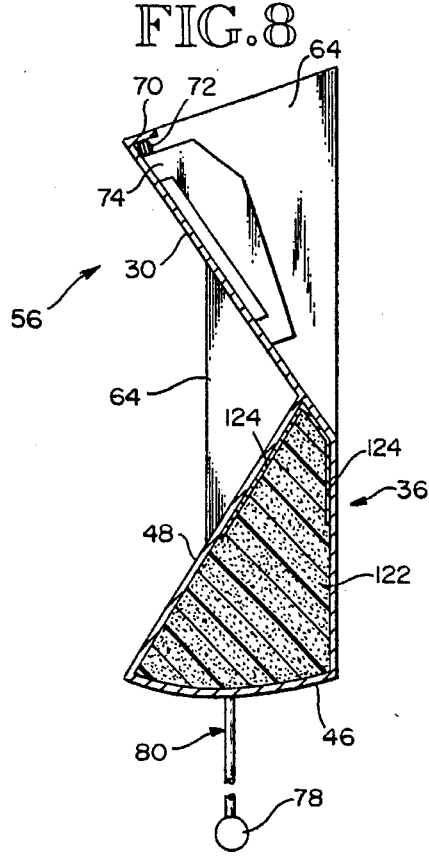
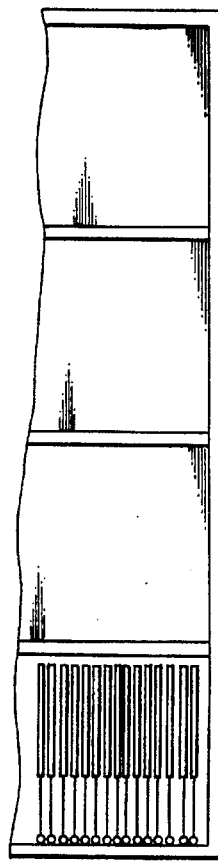
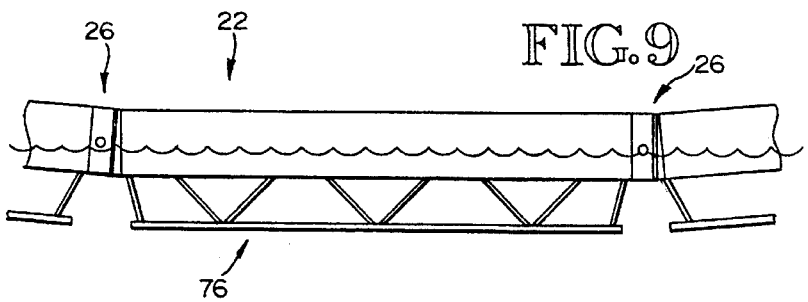

OIL CONTAINMENT BOOM

BACKGROUND

The present invention relates generally to floating containment booms deployed to prevent the spreading of contaminants over a body of water, and more particularly to foldable, compact, quick deploying oil containment booms for use in both high temperature and low temperature oil containment environments.

A number of inventions have been developed for the containment of oil spills to minimize environmental damage to oceans, harbors, and the like. Many of the early designs were directed to containing and preventing oil spills from spreading, but were not designed to withstand fires and high temperatures. Moreover, previous designs were typically difficult to handle, store and transport.

For example, U.S. Pat. No. 3,653,213 to Childers is directed to a floatable plastic barrier, molded on-site in a predetermined shape, secured to an elongated flexible member. The plastic barrier is used to contain oil spills in water locations. The flexible member is a cable to which the barrier is bonded directly or attached by clips as the barrier and cable are fed onto the water. The plastic barrier is preferably molded to a 90 degree V shape with the cable formed in or attached to the vertex of the Vee. This design, because of its plastic components, cannot be employed in high temperature situation. Moreover, because of its on-site molded design, the plastic boom cannot be easily removed and transported after its use.

In 1978, U.S. Pat. No. 4,116,007 issued to Stagemeyer disclosing a deployable barrier apron to be used with contaminant recovery systems to encompass or channel contaminant material to collection devices. The '007 Patent is made from substantially plastic components. Accordingly, like Childers, Stagemeyer is limited to containment situation where extreme high temperatures are not encountered.

In 1980, UK Patent 2,035,913 issued to Nyfeldt disclosing a floating fence for the collection of liquid impurities from a water surface. Included therein, is a net to capture impurities that pass through openings located between fence sections, i.e., spaces are intentionally left between boom sections. In addition, the fence includes a number of components made from plastic. Thus, Nyfeldt discloses a boom that is designed to allow small sized contaminant impurities to pass through the boom. As such, this design is limited to applications primarily involving the removal of large particles.

In 1981, U.S. Pat. No. 4,300,856 issued to Magoon disclosing a compactable, foldable boom fence designed to be launched, from the deck of a boat. The boom fence includes folded interconnected sections that deploy to form a boom fence for the control of a contaminates disposed on the surface of a body of water. Similar to Childers, Magoon includes boom segments that are joined by a flexible sheet-like material that is not fire resistant. Thus a boom constructed in accordance with Magoon cannot be used where oil fires are encountered.

In 1982 U.S. Pat. No. 4,330,223 issued to Webb disclosing a Anti-Pollution Barrier. The barrier comprises a plurality of boom segments having components made of plastics. Each segment includes two Z-shaped angles joined by a fastener. Like earlier designs, the segments are interconnected by a flexible membrane that serves to prevent oil from passing between segments. Consequently, Webb shares many of the same limitations that make it unusable in high temperature environments, namely its unprotected plastic components. Moreover, because the flexible membrane is molded into the boom segments, deployment and removal thereof is cumbersome and difficult.

Similarly, in 1990, a German Pat. Issued to Umweltschutz for a containment boom that includes plastic-coated components. Thus, like many previous designs, it too is limited to low temperature environments.

Later inventions began to employ high temperature resistant designs for removing oil contamination layers from water. For example, in 1983, U.S. Pat. No. 4,422,797 issued to McAllister disclosing a Fire Resistant Oil Spill Control Boom. This design allowed the user to remove the oil layer by burning it in place. The boom includes a plurality of units connected together by corrugated panels. Each of the units comprise a float member having panels extending vertically above and below the float member. The corrugated connecting panels have vertically oriented corrugations that form a flexible connection to secure adjacent float members together. Although this design allows deployment in high temperature environments, its corrugated design and the size of its floatation members make its handling, storage and transportation difficult.

In 1988 U.S. Pat. No. 4,781,493 issued to Fischer disclosing a containment boom suitable for use in high temperature environments. The boom comprises a plurality fire resistant layers of fabrics held together by mechanical fasteners or by ceramic thread. A protective polymer coating is placed on its first underlayer that burns off when employed in containing oil fires. Accordingly, repeated use of the boom in high temperature environments is limited. Also, because of its fabric design, it must be stored and recovered in the shape of a coil or the like.

In 1990, U.S. Pat. No. 4,923,332 issued to Sanocki and is generally similar to Fischer. The '332 patent discloses a boom having a plurality fire resistant layers of fabrics. Unfortunately, it shares many of the same problems including components thereof burning away in high temperature, fire related situations. Thus its repeated use is likewise limited.

In 1991, U.S. Pat. No. 5,056,958 issued to Campbell that discloses an elongate inflatable containment barrier that is manufactured on-site during the deployment thereof. The containment barrier operates by reducing the area disposed by the oil layer while simultaneously collecting and pumping the oil from the water surface. Like many previous designs, the barrier includes plastic components thereby limiting its use in high temperature environments. In addition, because it is manufactured on-site, recovery of the boom is difficult thereby increasing the costs of its use.

When considering the various adverse conditions that arise in oil containment situations, the above containment booms are generally limited in some way. Limitations regarding storability, reusability, and suitability for use in high temperature environments are found either alone or in combination in the above noted containment booms. Accordingly, a need remains for an oil containment boom that is compactable and arranged to be easily transported and deployed for use in high and low temperature containment situations, and one that can be reused many times without costly repairs.

SUMMARY OF THE INVENTION

One object of the present invention is to provide an improved oil containment barrier.

A second object is to provide a containment barrier that can be employed to contain oil spills that are afire.

A third object is to enable a user of the invention to isolate a quantity of spilled oil so that it can be disposed of by setting it afire.

Another object of the present invention is to provide a reusable oil containment boom.

A further object is to simplify the transportation problems associated with transporting an oil containment boom.

Still another object is to enable quick and simple deployment of a containment boom.

Yet another object: is to provide a strong, light weight containment boom where boom sections can be easily added or removed.

Yet another object is to be able to easily clean and store the containment boom after its use.

Still another object is to allow quick deployment from standard sized shipping containers.

The present invention is a continuous oil containment boom foldable to a compact configuration for storage in standard size 8' by 8' by 20' shipping containers. The invention is designed and arranged for quick deployment, ease of cleaning, and numerous deployment cycles. The containment boom comprises a plurality of elongate, boom segments constructed of a rigid material such as stainless steel. The containment boom is adapted for deployment in water to contain a floating layer of contaminants such as oil. Each boom segment includes an elongate lower flotation member for displacement of water to create an upward floatation force, and an elongate, impermeable upper barrier extending upward from the lower flotation member, above the surface of the contaminant layer. Each boom segment includes a first end and a horizontally spaced apart second end, wherein the boom segments are connected end-to-end to form a continuous containment boom. Each boom segment further includes a counterbalancing structure fixed to the boom segments to maintain the same in an upright position.

The floatation boom segments are connected end-to-end by a plurality of pivot joints to form a continuous containment boom. Each pivot joint includes at least two vertically oriented, overlapping pivot plates, adjacently disposed in parallel relation. The pivot plates being pivotally connected for relative pivotal movement about a horizontal axis disposed normal to the plane of the pivot plates. At least one pivot joint is disposed between each floatation boom segment, pivotally attaching adjacent boom segments together, end-to-end, so that said adjacent boom segments can pivot relatively about a horizontal axis.

In accordance with another aspect of the invention, the upper barrier is inclined to extend upward from the lower floatation member over the layer of contaminants. In this configuration, the upper barrier defines a thermal shield barrier adapted to reduce the temperatures in the region adjacent to the containment boom by generating a thick zone of smoke.

In accordance with another aspect of the invention, each pivot joint includes a pair of horizontally spaced apart hinge assemblies. Each hinge assembly being vertically oriented therein defining a vertical pivot axis to permit adjacent boom segments to pivot relatively about a vertical axis.

The foregoing and other objects, features, and advantages of this invention will become more readily apparent from the following detailed description of a preferred embodiment which proceeds with reference to the accompanying drawings.

BRIEF DESCRIPTION OF THE DRAWINGS

FIG. 3 is a cross-sectional view of a boom segment taken along line 3—3 illustrating a reinforced thermal shield barrier extending over the layer of contaminants upward from a vented floatation chamber having a counter weight extending downward therefrom.

FIG. 4 is a perspective view of an alternate embodiment of the invention illustrating boom segments exploded to show how hinge sleeves of a hinge assembly fit together in a pivot joint that pivotally joins the boom segments together.

FIG. 5 is a cross-section of an alternate embodiment of the invention where the lower floatation member extends upward to form the impermeable barrier, wherein the containment boom includes a form core for floatation.

FIG. 8 is a typical cross-section of a alternate embodiment illustrating a boom segment having a foam filled chamber for buoyancy with no air vent, protected by a thermal membrane.

FIG. 9 is an partial elevational view of a floating containment boom illustrating wave action on the boom segments.

FIG. 10 is an assembled containment boom ready for transportation to a spill site, wherein the boom is stored in a typical 8' by 20' by 20' storage container.

DETAILED DESCRIPTION OF PREFERRED EMBODIMENT

Figure 1:
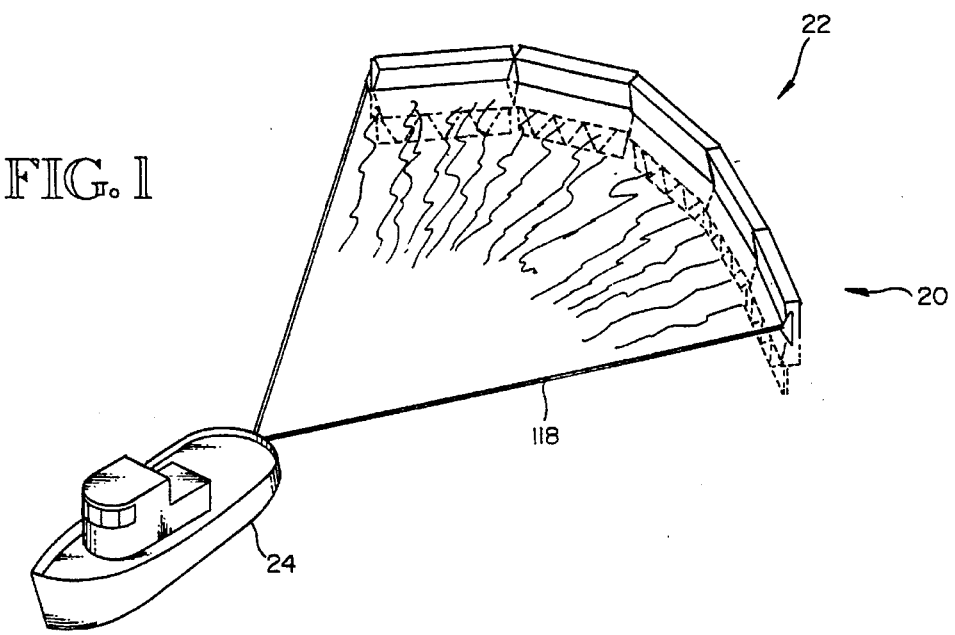
FIG. 1 is a perspective view of an Oil Containment Mile Boom being towed behind a boat to contain and move a layer of contaminants.
Figure 2:
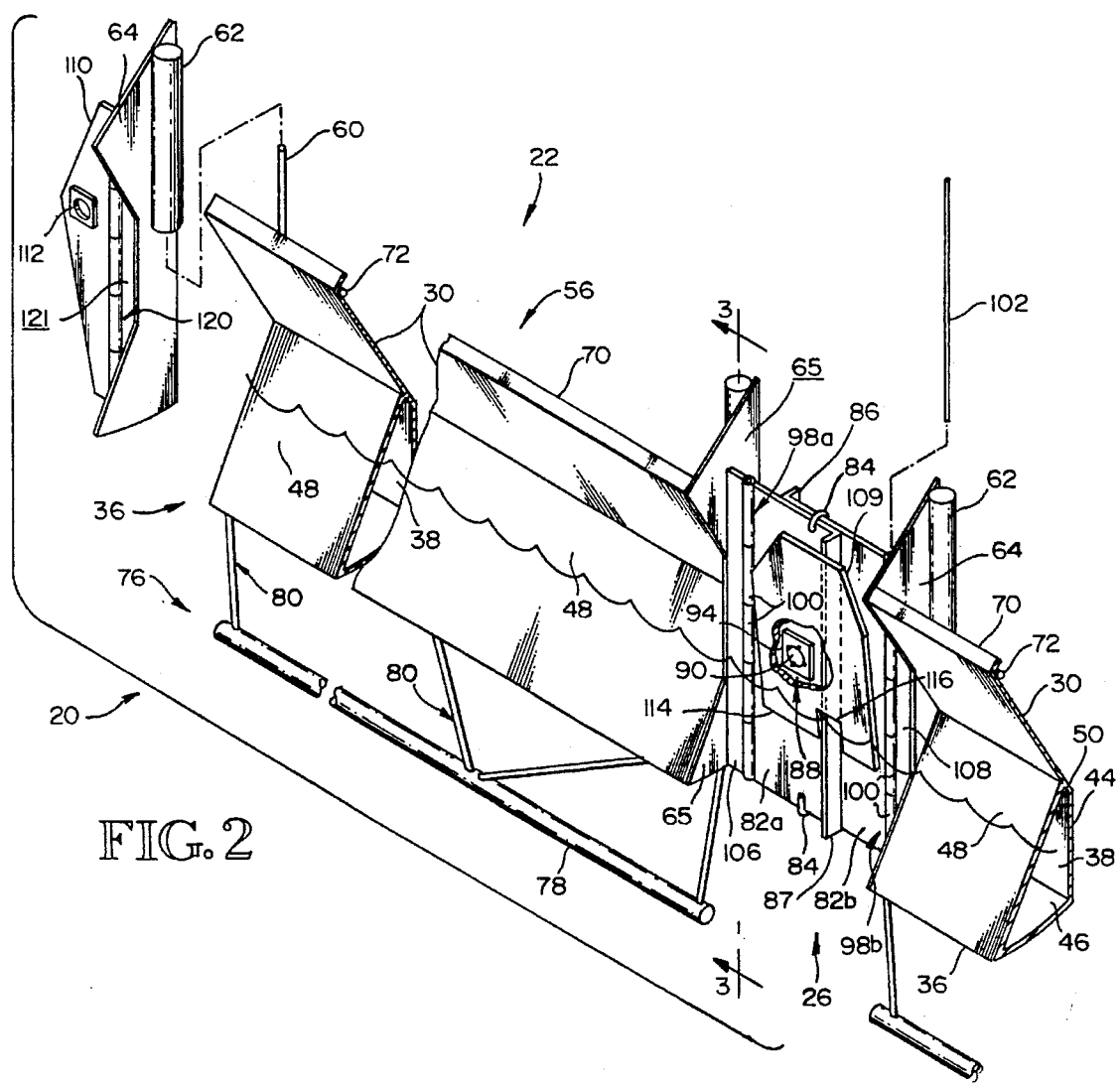
FIG. 2 is a perspective view illustrating two boom segments being connected by a pivot joint, with one boom segment having a hinged mooring plate for connecting the chain of boom segments to a tow line.

FIGS. 1 through 3 show a preferred embodiment of a containment boom 20 in accordance with the present invention. Generally, the containment boom 20 comprises a plurality of boom segments 22 pivotally connected end to end forming an impermeable barrier deployed to prevent the spread of contaminants over a body of water. For ease of cleaning, and for resistance to chemicals and high temperatures, the containment boom 20, including the components thereof, are typically manufactured of type "304" stainless steel of various shapes and gage thickness. The containment boom 20 can be employed to move contaminants to a desired location by towing the same behind a boat 24. The containment boom 20 can also be deployed to completely surround a oil contaminant layer, forming an endless circular chain of similar boom segments 22 to prevent the spreading thereof or to dispose of by burning.

Each boom segment 22 is connected to another similar boom segment 22 end-to-end by a pivot joint 26 disposed therebetween. Each pivot joint 26 is designed to allow the boom segments 22 to pivot relatively about two independent axes: about a vertical axis and about a horizontal axis disposed normal to longitudinal direction of the boom segment 22. In this way, the boom segments 22 can move and undulate according to wave motion to maintain an impermeable barrier that extends above the surface of the contaminant layer. Further, as will be see below, the design of the pivot joints 26 is such to allow the containment boom 20 to be folded in accordion like fashion to a size which allows storage and transportation in standard 8' by 8' by 20' shipping containers 28 as illustrated in FIG. 10.

Additionally, the preferred embodiment of the containment boom 20 is designed for high temperature applications. For example, it is often desirable to eliminate surface layers of oil contamination by burning the same in place before the layer of oil spreads to an uncontrollable size. Under these circumstances, temperatures as high as 900 degrees can be encountered. As will be discussed more fully below, a thermal shield barrier 30 is provided to lower the temperature in the immediate area surrounding the containment boom 20.

Considering now in more detail the structure of the components from which a containment boom 20 is assembled, FIG. 2 illustrates a pair of typical boom segments 22 having a lower flotation member 36 for displacement of water. By displacing water, an upward floatation force is created to support the boom segments 22. The lower floatation member 36 is constructed to form and define an elongate chamber 38 that extends the full length of the boom segment 22. In the preferred embodiment, the chamber 38 is completely sealed to prevent the entry of water therein.

The lower floatation member 36 includes four elongate members continuously joined to form the chamber 38. Typically such construction is accomplished by bending sheets of stainless steel into the desired tube-like shape or by welding the various members together, or by a combination thereof. In the preferred embodiment, the chamber 38 includes a substantially vertical back sidewall 44, a substantially horizontal bottom 46, an inclined front sidewall 48, and an inclined top 50. The opposite ends of the chamber are sealed by two opposing end plates 64–65. In addition, as will be seen below, end plates 64–65 also serve to support each vent housing 62, and to support the thermal shield barrier 30. As will be discussed more fully below, the front side 48 is inclined to act as a scoop to direct the layer of contaminants upward as the boom segments 22 move through the water, toward the layer of contaminants, thereby preventing the same from escaping below the containment boom 20.

Included in each boom segment 22 is an upper barrier 56 that extends upward from the lower flotation member 36 to create an impermeable fence or barrier to contain the layer of contaminants. In the preferred embodiment, the upper barrier 56 is inclined to extend over the contaminant layer. This arrangement creates a thermal shield barrier 30 to reduce the ambient temperature near the boom segments 22 when a surface layer of oil is afire. More specifically, the overhanging thermal shield barrier 30 is so designed to cause thick smoke to form adjacent to the surrounding area where the burning oil layer engages the thermal shield barrier 30. Accordingly, an oxygen starved area is created that inhibits the formation of flames. As a result, the temperature of boom segment components is reduced.

Further, for high temperature applications, a pair of vertically oriented vents 60 are disposed at each end of a boom segment 22, as illustrated in FIG. 3. Each vent 60 is in communication with the elongate chamber 38 to allow expanding gasses to escape. For protection of the vent 60, and to inhibit the entry of water therein, each vent 60 is covered and enclosed by a vent housing 62.

For support of the thermal shield barrier 30 in an inclined position, and for support of the vent housing 62, the end plates 64–65 extend upward and attach to the vent housing by welding or the like, as illustrated in FIG. 2.

Because the thermal shield barrier 30 is typically constructed of stainless steel sheet metal of a gage in the range of 16 to 26, it is reinforced to maintain its shape. In the preferred embodiment, the thermal shield barrier 30 is reinforced by forming an edge flange 70 on the leading edge of the thermal shield barrier 30. An edge flange 70 is so formed by bending the thermal shield barrier 30 as illustrated in FIGS. 2–3.

The edge flange 70 is further reinforced with a small diameter bar 72 disposed along the inside angle formed where the edge flange 70 meets the thermal shield barrier 30. The bar 72 is attached by welds to both the edge flange 70, and to the thermal shield barrier 30. To further reinforce the thermal shield barrier 30, a plurality of horizontally spaced stiffeners 74 are attached to the thermal shield barrier 30 as illustrated in FIG. 3. of each boom segment 22. The spaced stiffeners 74 provide additional support to the thermal shield barrier 30 to prevent deflection thereof, and are spaced to provide three or four each per boom segment 22.

To maintain the boom segments 20 in a vertical, upright position, a counter weight 76 is attached to the bottom 46 of the lower floatation member 36. The counterweight 76 comprises a ballast 78 formed of stainless steel bar material, and truss 80 that extends downward from the lower floatation member 36. Typically, a counterweight 76 is attached to each boom segment 22.

Turning again to FIG. 2, the boom segments 22 are connected end-to-end by a plurality of similarly constructed pivot joints 26. In the preferred embodiment, each pivot joint 26 is designed to pivot about two independent axes. More specifically, relative pivotal movement between adjacent boom segments 22 is restricted to relative pivotal movement about a substantially vertical axis, and about a substantially horizontal axis disposed 90 degrees to the direction that the boom segments 22 extend.

Relative pivotal movement about the horizontal axis is achieved by providing a pair of overlapping vertically oriented plates 82a–82b, adjacently disposed, having a pair of guide hooks 84 welded thereon so that close adjacent, side-by-side position between the overlapping plates 82a–82b is maintained. As illustrated in FIG. 2, the guide hooks 84 are U shaped to extend around the outside upper and lower edge of the overlapping plates 82a–82b. To remain in proper position, one leg of each guide hook 84 is welded to one of the overlapping plates 82a–82b. In this way, the side-by-side overlapping plates 82a–82b are restricted from separating in parallel relation.

Figure 6:
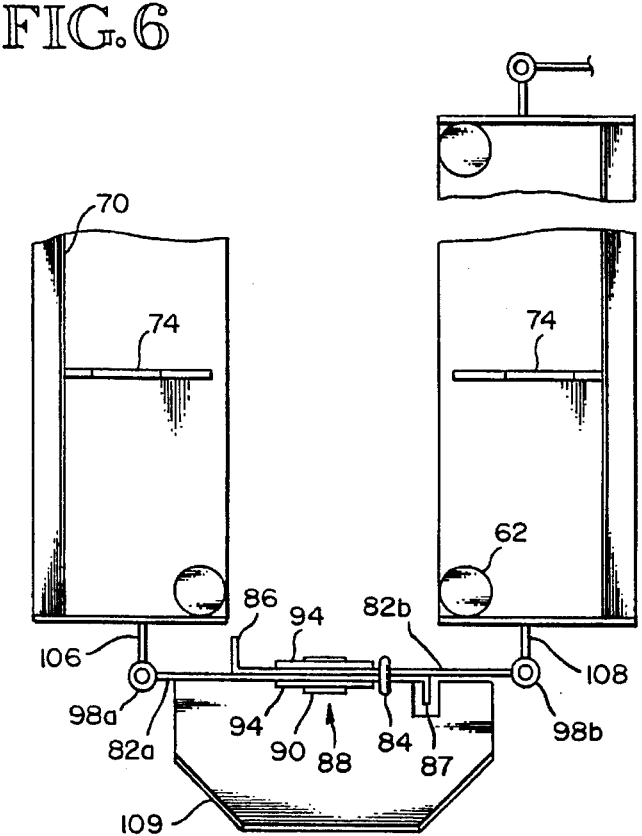
FIG. 6 is a partial plan view of the preferred embodiment illustrating boom segments joined by a pivot joint having a pair of overlapping vertical plates disposed between a pair of hinge assemblies to permit the containment boom to be folded in accordion fashion.
Figure 7:
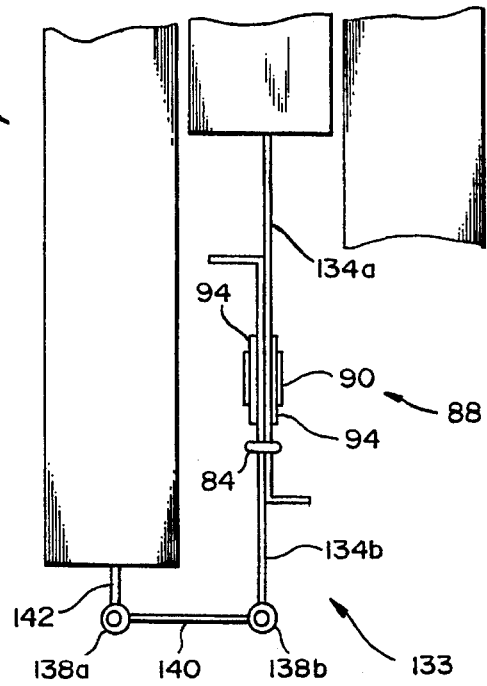
FIG. 7 is a partial plan view of an alternate embodiment illustrating boom segments joined by a pivot joint having side-by-side hinge assemblies disposed to one side of a pair of overlapping vertical plates to permit the containment boom to be folded in accordion fashion.

The overlapping plates 82a–82b are pivotally connected by a pivot hinge 88. The pivot hinge 88 comprises a pivot pin 90 that extends through apertures, not shown, formed through the overlapping plates 82a–82b. To maintain the pivot pin 90 in position, a pair of pin flanges 94 are fixedly attached to opposite ends of the pivot pin 90 after it is inserted through the apertures. In the preferred embodiment, the pin flanges 94 are rectangular flat plates made of stainless steel. The pin flanges 94 have a circular portion removed to form an aperture sized for a snug fit around the pivot pin 90. In this way the pin flanges 94 can be tack welded to the pivot pin 90. This construction allows the adjacent overlapping plates 82a–82b to pivot relatively about the pivot pin 90. In addition, the pivot pin 90 prevents the overlapping plates 82a–82b from shearing apart when longitudinal forces transmitted through the boom segments 22 are created. As illustrated in FIG. 6–7, the pin flanges 94 also provide additional means to maintain the overlapping plates 82a–82b in a close side-by-side relationship, wherein overlapping plated 82a–82b are sandwiched between the pin flanges 94.

To reinforce the overlapping plates 82a–82b, vertical flanges 86–87 are respectively formed on the overlapping plates 82a–82b as illustrated in FIG. 2. In this way, the overlapping plates 82a–82b resist warping under adverse conditions such as those that arise in high temperature environments.

To allow relative pivotal movement about a vertical axis between adjacent boom segments 22, each pivot joint 26 includes a pair of vertically oriented, spaced-apart, hinge assemblies 98a–98b. In the preferred embodiment, each hinge assembly 98a–98b is constructed similar to a common a "butt hinge"-like those found on household doors. Each hinge assembly 98a–98b comprises a plurality of alike tubular shaped hinge sleeves 100 concentrically disposed, one atop the other. Each hinge sleeve 100 is held in this position by a hinge pin 102, and as will be seen in the following, this pivotally joins the boom segments 22 together for relative pivotal movement about a vertical axis.

For example, to achieve relative pivotal movement about a vertical axis, a plurality of vertically oriented hinge sleeves 100 are fixedly attached, e.g., welded to an overlapping plate 82a. The hinge sleeves 100 being spaced apart with each space therebetween being equal to approximately the vertical length of a hinge sleeve 100. Likewise, a plurality of vertically oriented hinge sleeves 100 are fixedly attached to a connection plate 106 in a similar spaced relationship, but staggered to allow the hinge sleeves 100 of the overlapping plate 82a and of the connection plate 106 to inter-mesh so that each hinge sleeve 100 is oriented in concentric fashion. Once this configuration is achieved, a hinge pin 102 can be inserted therethrough to secure the two components together in a way that they can pivot relatively about the hinge pin 102. This configuration is further illustrated in FIG. 4 where a similar hinge assembly shown with the components spaced apart.

Similarly, the other hinge assembly 98b along with the adjacent overlapping plate 82b and the adjacent connection plate 108 are a mirror image of the hinge assembly 98a and its adjacent connection plate 106. Both hinge assemblies 98a–98b are constructed and operate in the same way.

Beyond this, the minimum horizontal distance that the hinge assemblies 98a–98b are spaced apart is determined by the maximum horizontal thickness of a boom segment 22. In the preferred embodiment, the spacing between the hinge assemblies 98a–98b is slightly more that the maximum horizontal thickness of a boom segment 22. In this way, the boom segments 22 can be folded in accordion-like fashion for compact storage in a standard size shipping container 28.

Additionally, each hinge pin 102 is manufactured to have a slight curve over its length. By having such a curve, the hinge pin 102 will frictionally engage the hinge sleeves 100 when inserted therethrough. Thus the hinge pin 102 will not become unintentionally dislodged if the boom segments 22 are accidentally turned upside down or the like.

Alternatively, the hinge sleeves 100 can be manufactured integrally with adjacent components. For example, hinge connection plate 106 could be manufactured with its edge curved to form a tubular sleeve 100 and designed to mesh with an overlapping plate 82a similarly formed to have integrally formed sleeves 100.

Turning again to FIG. 2, a pivot joint shield plate 109, i.e., shield plate 109., is illustrated secured to a pivot joint 26. The shield plate 109 is inclined to slope toward, and over the layer of contaminants, similar to the slope or incline of the thermal shield barrier 30. The shield plate 109 is provided to protect the pivot joint 26 from high temperatures generated by fires, and to assist in preventing wave action against the pivot joints 26. The shield plate 109 includes a lower edge 114 that is fixed to the pivot joint 26. More specifically, the lower edge 114 of the shield plate 109 is welded to the overlapping plate 82a. Although the shield plate 109 extends to cover a portion of the adjacent overlapping plate 82b, it is not fixed thereto. In this way, the adjacent overlapping plates 82a–82b can pivot relatively, unrestricted, about a horizontal axis. Also, the shield plate 109 includes a notch 116 formed on its lower edge by removing a portion of the shield plate 109, disposed to allow the vertical flange 87 to extend therethrough. The notch 116 permits unrestricted, relative pivotal movement between overlapping plates 82a–82b, about a horizontal axis.

Turning again to FIG. 1, a containment boom 20 can be towed behind a boat 24 to move the contaminants to any desired location. To facilitate the connection between the boat 24 and the containment boom 20, a hinged mooring plate 110 is provided on the boom segments 22 that represent the two ends of the containment boom 20. The hinged mooring plate 110 includes a mooring hole 112 for connection of tow lines 118 that connect the boat 24 to the containment boom 20. Similar to the pivot joints 26, the hinged mooring plate 110 includes a hinge assembly 120 that is identical to hinge assemblies 98a–98b in construction and operation. Likewise, the hinge assembly 120 is connected to a boom segment 22 by a connection plate 122 that is similar to hinge connection plate 106.

Turning now to FIG. 8, an alternate embodiment is illustrated showing a boom segment 22 that comprises an elongate chamber 38 having a foam floatation core 122 disposed therein. A foam floatation core 122 so disposed provides flotation for the boom segment 22, and eliminates the need to construct a sealed boom segment 22. Typically, the foam core is made of Styrofoam or the like. To protect the foam flotation core 122, a high temperature refractory thermal membrane 124, is disposed between the foam core 122 and the chamber 38. One such membrane, manufactured by ARMCO is a REFRASIL ®, UC100 Series cloth. In this way, heat from burning contaminants is shielded from the foam core 122. Further, by providing a foam core 122, the need for a vent 60, and vent housing 62 is eliminated thereby reducing the costs of manufacturing related thereto.

Attention is now directed to FIGS. 4–5, wherein an alternate embodiment is illustrated showing a containment boom 20' having a plurality of planar boom segments 22'. Like the preferred embodiment, each planar boom segment 22' includes a corresponding lower flotation member 36' and an upper barrier 56'. Unlike the preferred embodiment, however the alternate embodiment includes exterior surfaces that are nearly vertical, wherein the lower flotation member 36' extends upward, vertically, above the surface of the contaminant layer to form the upper barrier 56'. Similar to the preferred embodiment, an elongated chamber 130 is provided. For floatation, the chamber 130 has a foam core 132. In this way, the elongated chamber 130 does not have to be constructed air tight.

Like the preferred embodiment, a plurality of pivot joints 133 connect the boom segments 22' together, end-to-end. Included in each pivot joint 133 is a pair of overlapping vertically oriented plates 134a–134b pivotally connected by a pivot hinge 88 identical to the pivot hinge 88 of the preferred embodiment. As with the preferred embodiment, the overlapping plates 134a–134b pivot relatively about a horizontal axis defined by a pivot pin 90 included in the pivot hinge 88. Likewise, a pair of guide hooks 84 are disposed on the upper and lower edge of the overlapping plates 134a–134b to maintain the same in close parallel relation.

The primary difference between the pivot joint 26 of the preferred embodiment and the pivot joint 133 of the alternate embodiment illustrated in FIG. 4 is that the alternate embodiment includes a pair of hinge assemblies 138a–138b disposed side-by-side with a connection plate 140 disposed therebetween. The connection plate 140 is sized to horizontally space the hinge assemblies 138a–138b apart by a distance equal to or slightly greater than the thickness of the boom segments 22'. In this way, the boom segments 22' can be compactly folded in accordion like fashion.

The construction of the hinge assemblies 138a–138b, and of the overlapping plates 134a–134b are nearly identical to those of the preferred embodiment. The only difference being that the hinge assemblies 138a–138b are disposed to the side of the overlapping plates 134a–134b. With this configuration, one if the overlapping plates 134a is fixedly attached, e.g., directly to a boom segment 22' as illustrated in FIG. 4.

In operation, a containment boom 20 is transported to a contamination site in one or more standard sized shipping containers 28. Typically, 1200 feet of a high temperature resistant containment boom can be stored and transported in a standard size 8' by 8' by 20' shipping container 28. By contrast, 6100 feet of the alternate embodiment, as illustrated in FIG. 4, can fit in the same type shipping container 28. Also, because of the similarity of pivot joint structure between the preferred embodiment and the alternate embodiment illustrated in FIGS. 4–5, chains of respective boom segments can be connected, or the various boom segments 22 or 22' can be interchanged. This allows flexibility in containment boom configuration.

After arriving at the contamination site, the shipping container 28 is lowered into the water to an elevation where the boom segments 22 start to float. Once this is done, the containment boom can be towed out of the container 28, unfolding in accordion like fashion. Finally, the containment boom can be towed into position.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A floatable, continuous oil containment boom arranged to be stored and folded for quick deployment in water to control the spreading of contaminates such as oil thereover, wherein the boom is foldable to a compact configuration for storage in standard size shipping containers to facilitate transportation to a contamination site, the containment boom comprising:

a plurality of elongate, boom segments constructed of rigid material, adapted for deployment in water to contain a floating layer of contaminants such as oil, each boom segment having an elongate lower flotation member for displacement of water to create an upward floatation force, and an elongate, impermeable upper barrier extending upward from the lower flotation member, above the surface of the contaminant layer, each boom segment having a first end and a horizontally spaced apart second end, wherein the boom segments are connected end-to-end to form a continuous containment boom;

means for counterbalancing the boom segments to maintain the same in an upright position;

a plurality of pivot joints for connecting the floatation boom segments end-to-end to form a continuous containment boom, each pivot joint having at least two vertically oriented, overlapping pivot plates, adjacently disposed in parallel relation, said pivot plates being pivotally connected for relative pivotal movement about a horizontal axis disposed normal to the plane of the pivot plates;

wherein at least one pivot joint is disposed between each floatation boom segment, pivotally attaching adjacent boom segments together, end-to-end, so that said adjacent boom segments can pivot relatively about a horizontal axis;

wherein each pivot joint further comprises at least two horizontally spaced apart hinge assemblies, each hinge assembly having a vertical pivot axis to permit adjacent boom segments to pivot relatively about a vertical axis, said adjacent boom segments therein being able to pivot relatively about two independent axes; and wherein the overlapping vertical plates are pivotally attached by a pivot hinge having a horizontal pivot axis, each pivot hinge comprising a pivot pin horizontally disposed through apertures formed in each vertical plate, and a pin flange fixedly attached to each end of the pivot pin, disposed to retain the adjacent vertical plates therebetween.

2. A floatable, continuous oil containment boom arranged to be stored and folded for quick deployment in water to control the spreading of contaminates such as oil thereover, wherein the boom is foldable to a compact configuration for storage in standard size shipping containers to facilitate transportation to a contamination site, the containment boom comprising:

a plurality of elongate, boom segments constructed of rigid material, adapted for deployment in water to contain a floating layer of contaminants such as oil, each boom segment having an elongate lower flotation member for displacement of water to create an upward floatation force, and an elongate, impermeable upper barrier extending upward from the lower flotation member, above the surface of the contaminant layer, each boom segment having a first end and a horizontally spaced apart second end, wherein the boom segments are connected end-to-end to form a continuous containment boom;

means for counterbalancing the boom segments to maintain the same in an upright position;

a plurality of pivot joints for connecting the floatation boom segments end-to-end to form a continuous containment boom, each pivot joint having at least two vertically oriented, overlapping pivot plates, adjacently disposed in parallel relation, said pivot plates being pivotally connected for relative pivotal movement about a horizontal axis disposed normal to the plane of the pivot plates;

wherein at least one pivot joint is disposed between each floatation boom segment, pivotally attaching adjacent boom segments together, end-to-end, so that said adjacent boom segments can pivot relatively about a horizontal axis;

wherein the upper barrier comprises a thermal shield barrier extending upward from the lower floatation member, said thermal shield barrier being inclined to extend over the layer of contaminates; and wherein the pivot joints further comprise a thermal joint plate fixedly attached thereto, said thermal joint plate being inclined to extend over the layer of contaminates.

3. A floatable, high temperature resistant, reusable, continuous oil containment boom arranged to be stored and folded for quick deployment in water to control the spreading of flaming contaminates such as oil thereover, wherein the boom is foldable to a compact configuration for storage in standard size shipping containers to facilitate transportation to a contamination site, the containment boom comprising:

a plurality of elongate, boom segments constructed of rigid material, adapted for deployment in water to contain a floating layer of contaminants such as oil, each boom segment having a lower flotation member for displacement of water to create an upward floatation force, and an upper impermeable barrier extending upward from the lower flotation member, above the surface of the contaminant layer, each boom segment having a first end and a horizontally spaced apart second end, wherein the boom segments are connected end-to-end to form a continuous containment boom;

means for counterbalancing the boom segments to maintain the same in an upright position;

a plurality of pivot joints for connecting the floatation boom segments end-to-end to form a continuous containment boom, wherein at least one pivot joint is disposed between each floatation boom segment, pivotally attaching adjacent boom segments together, end-to-end, said pivot joint being pivotable about two independent axes such that adjacent boom sections are relatively pivotable about two independent axes;

wherein the upper barrier is inclined, extending upward from the lower floatation member over the layer of contaminates therein defining a thermal shield barrier adapted to reduce high temperatures created by a burning contaminant layer; and wherein the pivot joints further comprise a thermal joint plate fixedly attached thereto, said thermal joint plate being inclined to extend over the layer of contaminates.

4. A floatable, continuous oil containment boom arranged to be compactly folded and stored in standard size 8' by 8' by 20' shipping containers to facilitate transportation to a contamination site, the boom being configured for quick deployment in water to control the spreading of contaminates such as oil thereover, the containment boom comprising:

a plurality of elongate, substantially planar boom segments constructed of rigid material, adapted for deployment in water to contain a floating layer of contaminants such as oil, each boom segment comprising an elongate flotation member for displacement of water to create an upward floatation force, said flotation member extending upward, above the surface of the contaminant layer, each boom segment having a first end and a horizontally spaced apart: second end, wherein the boom segments are connected end-to-end to form a continuous containment boom;

means for counterbalancing the boom segments to maintain the same in an upright position; and a plurality of pivot joints for connecting the floatation boom segments end-to-end to form a continuous containment boom, wherein at least one pivot joint is disposed between each floatation boom segment, pivotally attaching adjacent boom segments together, end-to-end, each pivot joint comprising:

a) two horizontally spaced apart hinge assemblies, each hinge assembly having a vertical pivot axis to permit adjacent boom segments to pivot relatively about a vertical axis, and b) a pair of vertically oriented, overlapping pivot plates, adjacently disposed in parallel relation, said pivot plates being pivotally connected for relative pivotal movement about a horizontal axis disposed normal to the plane of the pivot plates, said pivot plates disposed to pivotally attach adjacent boom segments together, end-to-end, so that said adjacent boom segments can pivot relatively about a horizontal axis; and wherein the hinge assemblies are adjacently disposed to one side of the overlapping pivot plates.

5. A continuous containment boom as recited in claim 4 wherein the overlapping vertical plates are pivotally attached by a pivot hinge having a horizontal pivot axis.

6. A continuous containment boom as recited in claim 4 wherein each floatation member includes a foam core to provide floatation.

* * * * *